United States Patent
Hakola et al.

(10) Patent No.: US 9,319,861 B2
(45) Date of Patent: Apr. 19, 2016

(54) METHOD AND APPARATUS FOR SMALL CELL DISCOVERY AND USER EQUIPMENT DISCOVERY

(71) Applicant: Broadcom Corporation, Irvine, CA (US)

(72) Inventors: Sami-Jukka Hakola, Kempele (FI); Samuli Turtinen, Li (FI); Timo Kalevi Koskela, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/153,328

(22) Filed: Jan. 13, 2014

(65) Prior Publication Data

US 2014/0199999 A1    Jul. 17, 2014

(30) Foreign Application Priority Data

Jan. 14, 2013 (GB) .................................. 1300632.5

(51) Int. Cl.
| H04W 4/00 | (2009.01) |
| H04W 8/00 | (2009.01) |
| H04W 48/16 | (2009.01) |
| H04W 84/04 | (2009.01) |

(52) U.S. Cl.
CPC .............. *H04W 8/005* (2013.01); *H04W 48/16* (2013.01); *H04W 84/045* (2013.01)

(58) Field of Classification Search
CPC .... H04W 48/16; H04W 84/045; H04W 8/005
USPC ....................... 455/435.1, 437, 446
See application file for complete search history.

(56) References Cited

U.S. PATENT DOCUMENTS

| 2011/0085453 A1 | 4/2011 | Wu et al. |
| 2012/0045989 A1 | 2/2012 | Suumaki et al. |
| 2012/0102106 A1 | 4/2012 | Chen |
| 2012/0263145 A1* | 10/2012 | Marinier ............... H04W 48/08 370/331 |
| 2013/0017820 A1* | 1/2013 | Drazynski ............. H04W 48/16 455/422.1 |
| 2013/0064138 A1* | 3/2013 | Hakola et al. .................. 370/255 |
| 2013/0079049 A1* | 3/2013 | Yu .......................... H04W 48/16 455/524 |
| 2013/0122893 A1* | 5/2013 | Turtinen ............... H04W 8/005 455/423 |
| 2013/0183963 A1* | 7/2013 | Turtinen et al. ............. 455/426.1 |
| 2013/0288608 A1* | 10/2013 | Fwu et al. ..................... 455/63.1 |
| 2014/0031028 A1* | 1/2014 | Yamada et al. ............... 455/419 |
| 2014/0066058 A1* | 3/2014 | Yu et al. ......................... 455/434 |

* cited by examiner

*Primary Examiner* — Mong-Thuy Tran
(74) *Attorney, Agent, or Firm* — Oblon, McClelland, Maier & Neustadt, L.L.P.

(57) ABSTRACT

Methods, apparatuses and a computer program product for small cell and user equipment discovery. The present invention includes obtaining information regarding small cell discovery on macro layer, obtaining information regarding user equipment discovery, determining whether the information regarding user equipment discovery depends on the information regarding small cell discovery, if it is determined that the information regarding user equipment discovery depends on the information regarding small cell discovery, building parameters for user equipment discovery based on parameters for small cell discovery included in the information regarding small cell discovery, and starting small cell discovery and user equipment discovery based on the parameters.

20 Claims, 5 Drawing Sheets

METHOD AND APPARATUS FOR SMALL CELL DISCOVERY AND USER EQUIPMENT DISCOVERY

TECHNICAL FIELD

The present invention relates to discovery. In particular, but not exclusively, the present invention relates to methods, apparatus and computer program products for use in small cell and UE discovery.

BACKGROUND

In both small cell and Proximity Services (ProSe), the discovery process plays an essential role. In the former, the user equipment (UE) aims at finding a cell and in the latter the UE aims at finding another UE within its proximity.

Thus, coordination is needed to organize the discovery occasions in a way that the energy consumption of UEs can be minimized.

SUMMARY

According to aspects of the present invention, there are provided a method, apparatus and a computer program product for small cell and UE discovery. Various aspects of embodiments of the present invention are set out in the appended claims.

According to a first aspect of the present invention, there is provided a method for use in small cell and user equipment discovery, the method comprising:

obtaining, at a user equipment, information regarding small cell discovery on macro layer;

obtaining, at the user equipment, information regarding user equipment discovery;

determining, at the user equipment, whether the information regarding user equipment discovery depends on the information regarding small cell discovery;

in response to determining that the information regarding user equipment discovery depends on the information regarding small cell discovery, building parameters for user equipment discovery based on parameters for small cell discovery included in the information regarding small cell discovery; and initiating, at the user equipment, small cell discovery and user equipment discovery based on the parameters.

According to a second aspect of the present invention, there is provided a method for use in small cell and user equipment discovery, the method comprising:

preparing, at a base station, information regarding small cell discovery;

preparing, at the base station, information regarding user equipment discovery;

determining, at the base station, whether the information regarding user equipment discovery is to be prepared depending on the information regarding small cell discovery, wherein, if it is determined that the information regarding user equipment discovery is to be prepared depending on the information regarding small cell discovery, the preparing of the information regarding user equipment discovery includes inserting a link to the information regarding small cell discovery; and transmitting the information regarding small cell discovery and the information regarding user equipment discovery to user equipment.

According to a third aspect of the present invention, there is provided apparatus for use in small cell and user equipment discovery in a user equipment, the apparatus comprising a processing system configured to cause the apparatus at least to:

obtain information regarding small cell discovery on macro layer;

obtain information regarding user equipment discovery;

determine whether the information regarding user equipment discovery depends on the information regarding small cell discovery;

in response to determining that the information regarding user equipment discovery depends on the information regarding small cell discovery, build parameters for user equipment discovery based on parameters for small cell discovery included in the information regarding small cell discovery; and initiate small cell discovery and user equipment discovery based on the parameters.

According to a fourth aspect of the present invention, there is provided apparatus for use in small cell and user equipment discovery in a base station, the apparatus comprising a processing system configured to cause the apparatus at least to:

prepare information regarding small cell discovery;

prepare information regarding user equipment discovery;

determine whether the information regarding user equipment discovery is to be prepared depending on the information regarding small cell discovery, wherein if it is determined that the information regarding user equipment discovery is to be prepared depending on the information regarding small cell discovery, the preparing of the information regarding user equipment discovery includes inserting a link to the information regarding small cell discovery; and transmit the information regarding small cell discovery and the information regarding user equipment discovery to at least one user equipment.

According to a fifth aspect of the present invention, there is provided a computer program product comprising a set of instructions which, when executed by a computerised device, is arranged to cause the device to carry out a method according to the first or second aspects of the present invention.

According to embodiments, there is provided a computer program product comprising computer-executable computer program code which, when the program is run on a computer (e.g. a computer of an apparatus according to any one of the aforementioned apparatus-related exemplary aspects of the present invention), is arranged to cause the computer to carry out the method according to any one of the aforementioned method-related aspects of the present invention.

Such computer program product may comprise or be embodied as a (tangible) computer-readable (storage) medium or the like on which the computer-executable computer program code is stored, and/or the program may be directly loadable into an internal memory of the computer or a processor thereof.

Further features and advantages of the invention will become apparent from the following description of preferred embodiments of the invention, given by way of example only, which is made with reference to the accompanying drawings.

BRIEF DESCRIPTION OF THE DRAWINGS

For a more complete understanding of embodiments of the present invention, reference is now made to the following description taken in connection with the accompanying drawings in which.

DETAILED DESCRIPTION

Examples aspects of the present invention will be described herein below. More specifically, example aspects of the present are described hereinafter with reference to particular non-limiting examples and embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain example network configurations and deployments. Namely, the present invention and its embodiments are mainly described in relation to 3GPP specifications being used as non-limiting examples for certain network configurations and deployments. In particular, a LTE/LTE-Advanced communication system is used as a non-limiting example for the applicability of thus described embodiments. As such, the description of embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

In this regard, it is noted that certain embodiments of the invention are applicable to any cellular system that support direct communication between UEs along with infrastructure based communication and that LTE and LTE-A are just examples of the systems in which the invention is implementable.

The present invention is related to local area access evolution to be studied in Release 12 in 3GPP (3$^{rd}$ Generation Partnership Project). As one option, a separate frequency layer is dedicated for small cell deployment. Furthermore, ProSe UE discovery and communication (also known as Device-to-Device (D2D) communications) could utilize the same spectrum. The operation in small cell frequency layer can be controlled by the overlaying macro that provides the coverage in another frequency layer over a coverage area of multiple small cells. The control relationship between macro and small cell layer varies depending on the selected architecture. According to the present invention, it is assumed that the macro layer may provide common control information for the UEs operating in the small cell layer.

According to the present invention, it is assumed that the network can configure ProSe UE discovery resources and can signal the configurations to the ProSe UEs via discovery specific system information block (SIB) type.

In Long Term Evolution (LTE), cell discovery (usually called cell search) is based on detection of PSS (Primary Synchronization Signal) and SSS (Secondary Synchronization Signal) signals that are transmitted with 5 ms periodicity. However, it is considered that the periodicity requirement could be relaxed for small cell discovery to allow the small cell eNB to have a possibility for feasible sleeping periods when there is no active connection with any UE. On the other hand, the periodicity of cell discovery signals cannot be too high.

According to the present invention, there is proposed a joint cell and UE discovery assisted by the overlaying wide area/macro network with unidirectional relationship such that the configuration of UE discovery may be dependent on the configuration of small cell discovery but not vice versa.

Assuming that the overlaying macro network configures the discovery occasions for both cell and UE discovery via some new SIB type(s), such a new SIB would include also an indication about the periodicities of the cell and UE discovery, and the timing of cell and UE discovery occasions are linked to the system frame number (SFN) of the macro network or to the SFN of the macro eNB the SIB is transmitted from.

Both small cell and UE discovery occasions are determined as a time window starting from the calculated SFN value according to configured periodicity during which the transmission shall take place. The configured resources could be spanned over multiple subframes to allow multiple discovery channels to be defined per each discovery resource chunk. This would allow a randomization among the transmitters as well as flexibility to take into account the transmissions in the macro connections for instance if radio capabilities are to be shared among macro, small cell and ProSe features by the UE (i.e. UE has active connection via macro while it is performing small and UE discovery).

Randomization instead of fixed transmission turns by the transmitters is desirable such that every transmitter is also able to detect other transmitters as well (assuming that in the frequency domain there would be more than one discovery channel multiplexed in one subframe). This would be beneficial especially in UE discovery.

Further, in order to maximize energy savings for cells and UEs, both cell and UE discovery radio resources could take place around the same time.

Cell discovery transmissions could take place first in time to provide synchronization for the following UE discovery transmissions. For that, a timing offset can be defined for the UE discovery transmission occasions as how many subframes they are shifted related to cell discovery timing info when the UE discovery occasions are scheduled. The offset would be signaled in the discovery SIB type dedicated for the ProSe enabled UEs.

Figure 1:
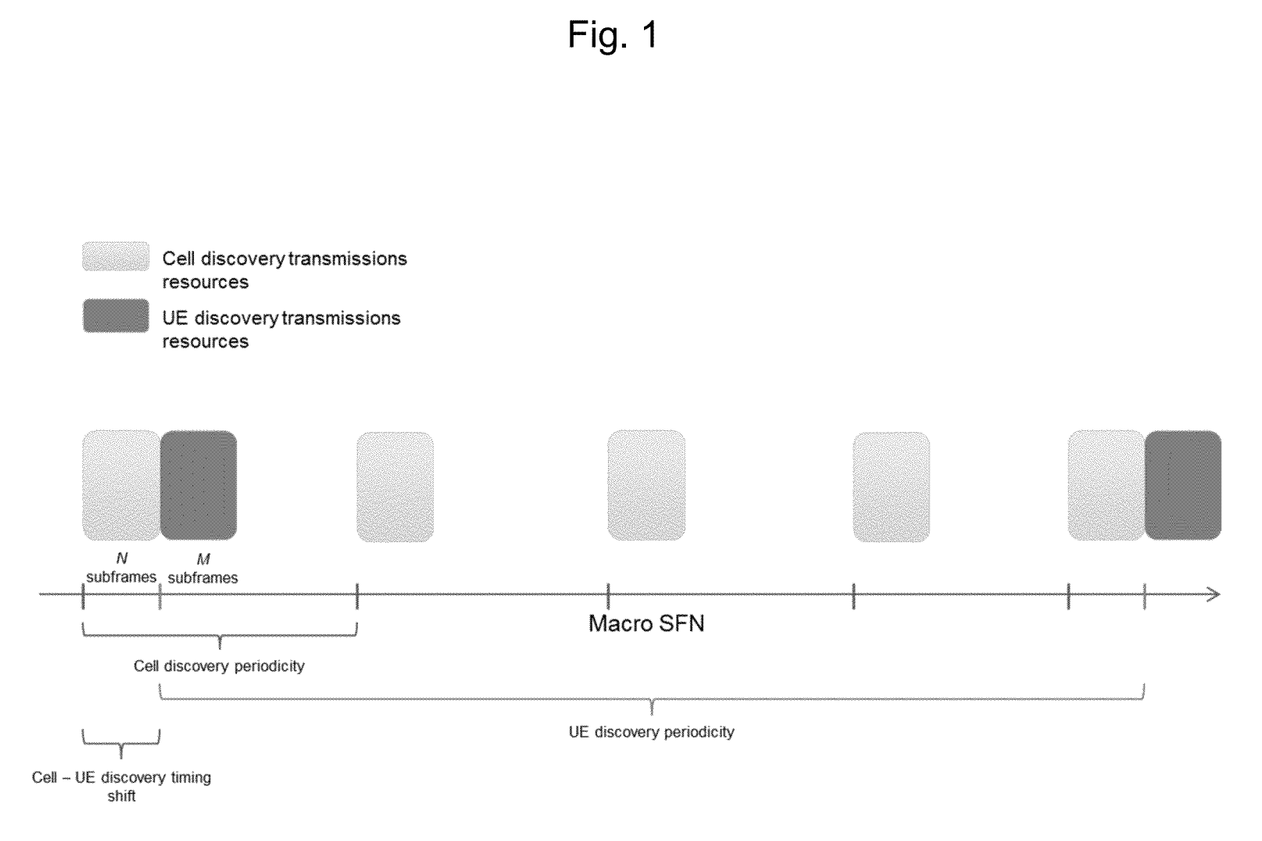
FIG. 1 is a diagram illustrating the dependency between small cell and UE discovery on small cell frequency layer.

FIG. 1 is an overview that illustrates the dependency between small cell and UE discovery on a small cell frequency layer.

In the following, an example of an implementation of the present invention will be described. However, it is noted that the present invention is not limited to the described example.

First, the UE reads a small cell discovery SIB on a macro layer.

Then, if the UE has registered to a ProSe Service, the UE further reads a UE discovery SIB.

The UE discovery SIB has a pointer that indicates whether it depends on some other SIB's configuration. If the pointer indicates no value, the UE discovery SIB includes all the required parameters for "standalone" UE discovery (e.g. no dependency on small cell discovery). In this case, the UE discovery could take place for instance on a macro layer.

If the pointer indicates there is a dependency on the small cell discovery SIB, ProSe UE shall build the UE discovery parameters upon small cell discovery parameters.

In this regard, the parameters comprise at least UE discovery periodicity (could be for instance an integer value indicating UE discovery periodicity as a given integer multiple of small cell discovery periodicity), timing parameter as to how much UE discovery periodicity is shifted in relation to small cell discovery periodicity, etc.

Then, the UE initiates (or 'starts') the active small cell and UE discovery processes.

Thus, the present invention provides the following advantages.

The UE discovery configuration can be optimized when it is linked to the small cell discovery. Further, there is provided an energy efficient joint small cell and UE discovery by allowing long sleeping periods when there is no traffic on the small cell layer. Further, the present invention allows UE discovery over the small cell borders when the overlaying macro layer handles the discovery resource allocation for both small cell and UE discovery.

Figure 2:
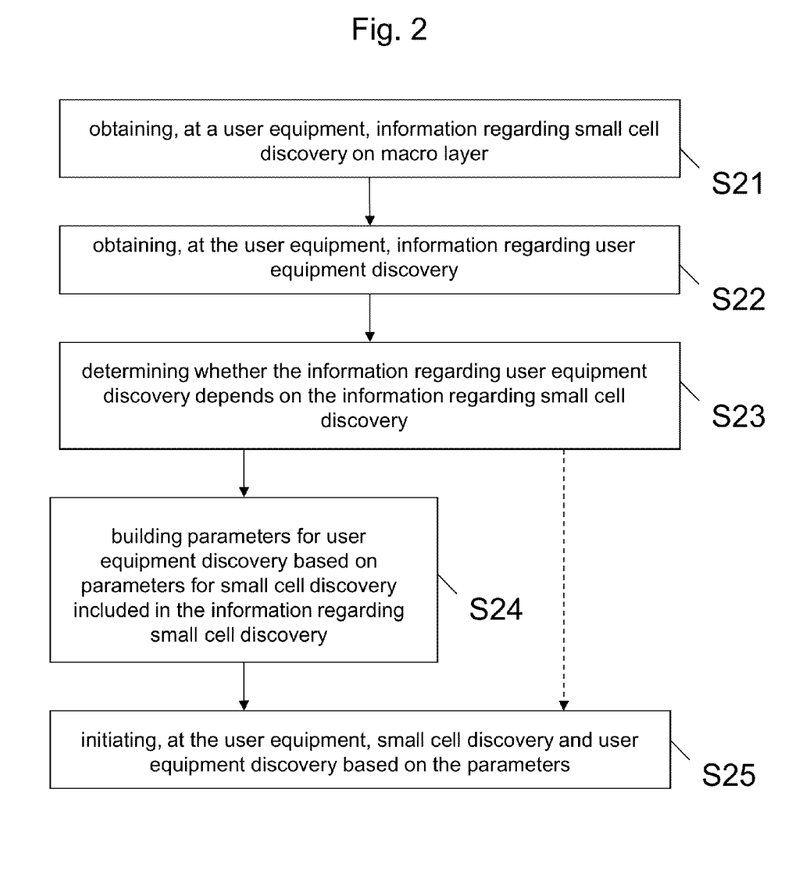
FIG. 2 shows a principle flowchart of an example method according to certain embodiments of the present invention.

FIG. 2 shows a principle flowchart of an example method according to certain embodiments of the present invention. That is, as shown in FIG. 2, this method comprises obtaining, by a user equipment, information regarding small cell discovery on a macro layer in a step S21 and obtaining information regarding user equipment discovery in a step S22. Then, the user equipment determines in a step S23 whether the information regarding user equipment discovery depends on the information regarding small cell discovery. That is, the user equipment determines whether the information regarding UE discovery includes all required parameters for standalone UE discovery, as mentioned above.

If it is determined that the information regarding user equipment discovery depends on the information regarding small cell discovery in step S23, the user equipment builds parameters for user equipment discovery in step S24 based on parameters for small cell discovery included in the information regarding small cell discovery. That is, for example, the user equipment builds the UE discovery periodicity as an integer multiple of the small cell discovery periodicity. Then, in a step S25, the user equipment initiates (or 'starts') small cell discovery and user equipment discovery based on the parameters.

If it is determined in step S23 that the information regarding user equipment discovery does not depend on the information regarding small cell discovery, i.e. that the information regarding UE discovery includes all required parameters for standalone UE discovery, the user equipment directly initiates (or 'starts') small cell discovery and user equipment discovery based on the parameters in step S25.

According to embodiments of the present invention, the parameters included in the information regarding small cell discovery comprise at least a parameter related to small cell discovery periodicity and a parameter related to a time shift of the user equipment periodicity with respect to the small cell discovery periodicity.

According to further embodiments of the present invention, the timing of the small cell discovery is linked to a system frame number of a macro network or the system frame number of the macro base station from which the information is obtained.

According to further embodiments of the present invention, the information is contained in at least one system information block transmitted from a macro base station.

According to embodiments of the present invention, the method is implemented in a user equipment located in an LTE or LTE-A based cellular communication network. In this case, the information is transmitted from an evolved node B of the LTE or LTE-A based cellular communication network to a user equipment.

Figure 3:
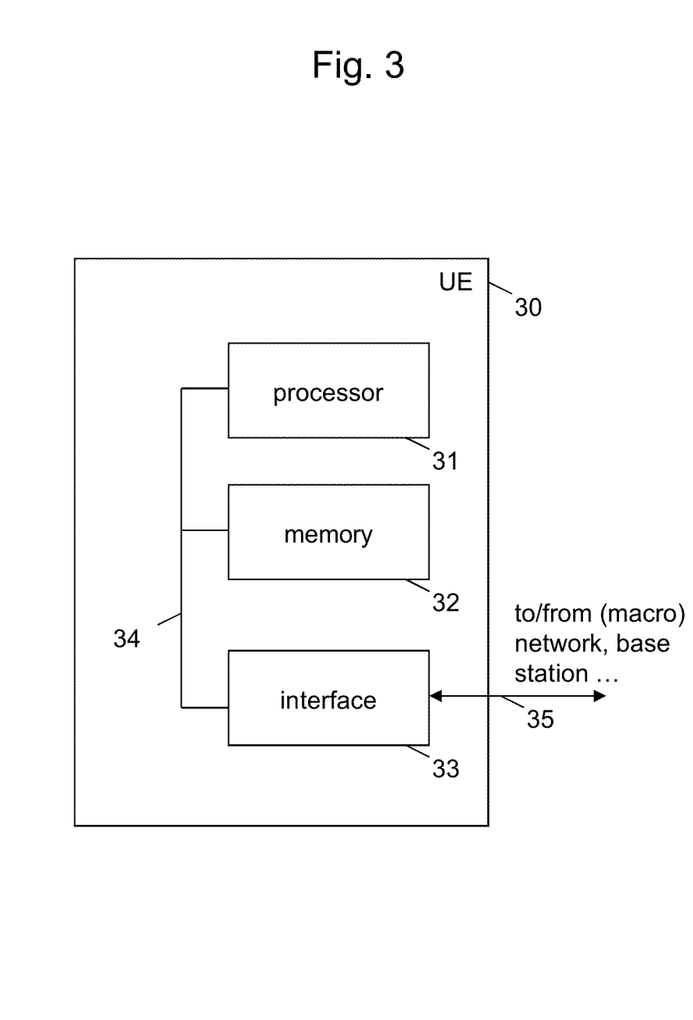
FIG. 3 shows a principle configuration of an example apparatus according to certain embodiments of the present invention.

FIG. 3 shows a principle configuration of an example user equipment according to certain embodiments of the present invention. One option for implementing this example for a user equipment according to certain embodiments of the present invention would be a component in a handset such as user equipment UE according to LTE/LTE-A. For example, the user equipment may comprise a mobile phone, a personal digital assistant (PDA), a laptop computer, a tablet computer, or the like.

Specifically, as shown in FIG. 3, the example for a user equipment 30 comprises a processing system and/or at least one processor 31, at least one memory 32 including computer program code and an interface 33 which are connected by a bus 34 or the like. The at least one memory and the computer program code are arranged to, with the at least one processor, cause the user equipment at least to perform obtaining information regarding small cell discovery on macro layer, obtaining information regarding user equipment discovery, determining whether the information regarding user equipment discovery depends on the information regarding small cell discovery, if it is determined that the information regarding user equipment discovery depends on the information regarding small cell discovery, building parameters for user equipment discovery based on parameters for small cell discovery included in the information regarding small cell discovery, and initiating (or 'starting') small cell discovery and user equipment discovery based on the parameters.

For further functions of the user equipment according to further embodiments of the present invention, reference is made to the above description of a method according to certain embodiments of the present invention, as described in connection with FIG. 2.

Figure 4:
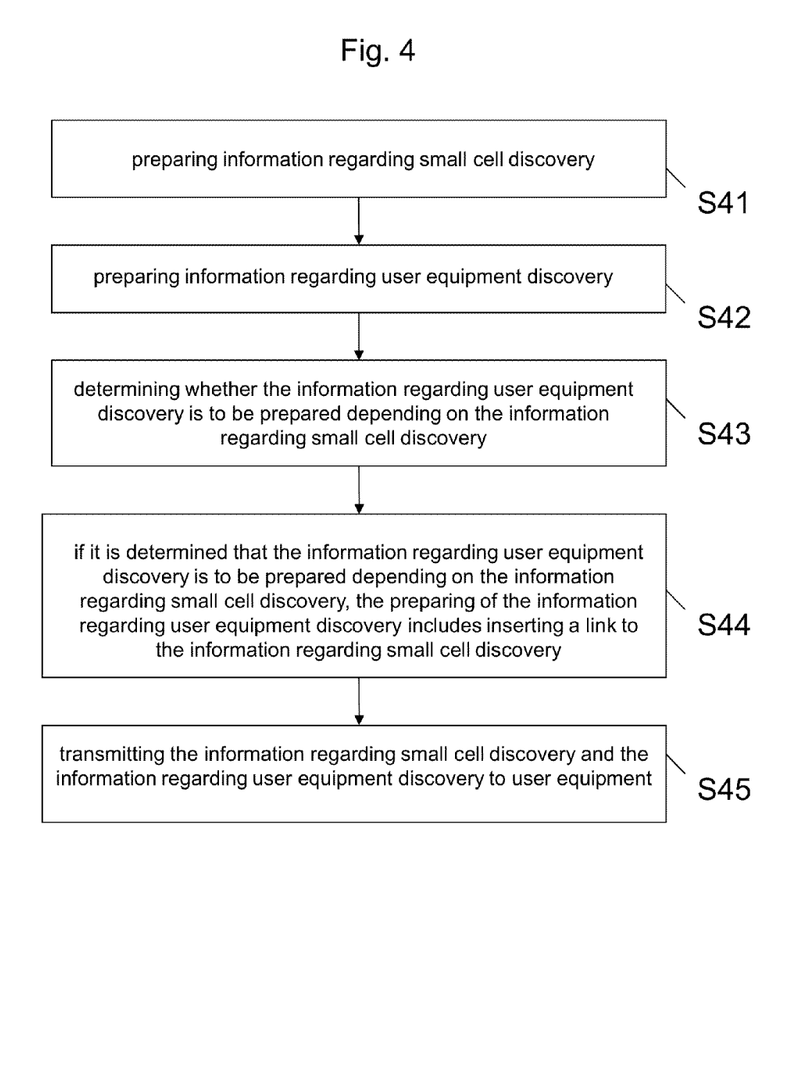
FIG. 4 shows a principle flowchart of another example method according to certain embodiments of the present invention.

FIG. 4 shows a principle flowchart of another example method according to certain embodiments of the present invention. That is, as shown in FIG. 4, this method comprises preparing, at a base station, information regarding small cell discovery in a step S41, and preparing, at the base station, information regarding user equipment discovery in a step S42. The method further comprises determining, in a step S43, whether the information regarding user equipment discovery is to be prepared depending on the information regarding small cell discovery.

If it is determined in step S43 that the information regarding user equipment discovery is to be prepared depending on the information regarding small cell discovery, the preparing of the information regarding user equipment discovery includes inserting a link to the information regarding small cell discovery in a step S44, and the method further comprises transmitting the information regarding small cell discovery and the information regarding user equipment discovery to user equipment in a step S45.

According to embodiments of the present invention, the information regarding small cell discovery comprises parameters including at least a parameter related to small cell discovery periodicity and a parameter related to a time shift of the user equipment periodicity with respect to the small cell discovery periodicity.

According to embodiments of the present invention, the timing of the small cell discovery is linked to a system frame number of a macro network or the system frame number of the base station.

According to embodiments of the present invention, the information is contained in at least one system information block transmitted from the base station.

According to embodiments of the present invention, the method is implemented in a base station located in an LTE or LTE-A based cellular communication network.

Figure 5:
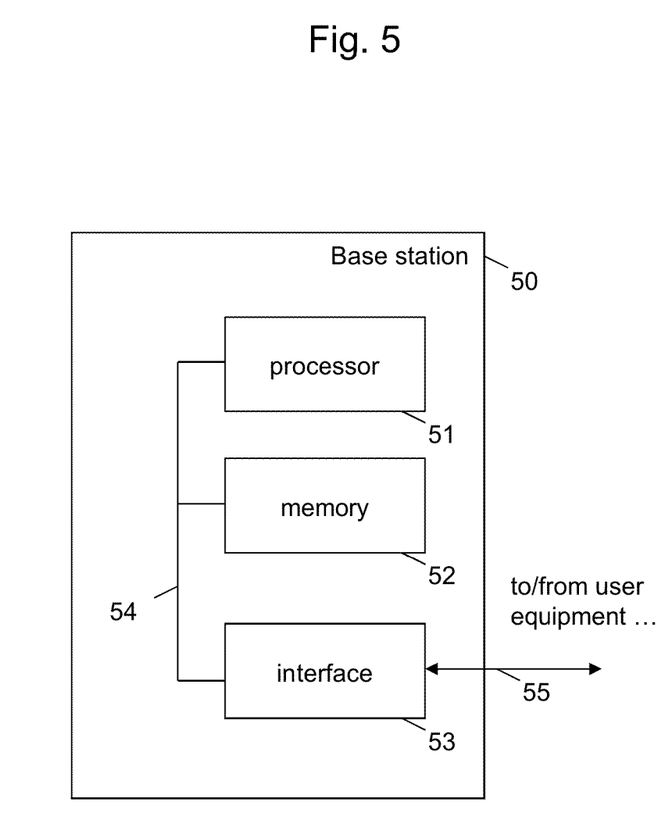
FIG. 5 shows a principle configuration of another example apparatus according to certain embodiments of the present invention.

FIG. 5 shows a principle configuration of another example apparatus according to certain embodiments of the present invention. One option for implementing this example apparatus according to certain embodiments of the present invention would be a base station in a 3G communication network or an eNB according to LTE/LTE-A.

Specifically, as shown in FIG. 5, the example apparatus 50, e.g. a base station or an eNB, comprises a processing system and/or at least one processor 51, at least one memory 52 including computer program code, and an interface 53 which are connected by a bus 54 or the like. The at least one memory and the computer program code are arranged to, with the at least one processor, cause the apparatus at least to perform preparing information regarding small cell discovery, preparing information regarding user equipment discovery, determining whether the information regarding user equipment discovery is to be prepared depending on the information regarding small cell discovery, if it is determined that the information regarding user equipment discovery is to be prepared depending on the information regarding small cell discovery, the preparing of the information regarding user equipment discovery includes inserting a link to the information regarding small cell discovery, and transmitting the information regarding small cell discovery and the information regarding user equipment discovery to user equipment.

For further functions of the base station/eNB according to further embodiments of the present invention, reference is made to the above description of a method according to certain embodiments of the present invention, as described in connection with FIG. 4.

In the foregoing example description of the apparatuses, i.e. the user equipment or base station (or part of the user equipment or base station), only the units that are relevant for understanding the principles of the invention have been described using functional blocks. The apparatuses may comprise further units that are necessary for its respective operation as user equipment or base station, respectively. However, a description of these units is omitted in this specification. The arrangement of the functional blocks of the apparatuses is not construed to limit the invention, and the functions may be performed by one block or further split into sub-blocks. Further, the apparatuses, i.e. the user equipment or base station, may be connected via a link 35/55. The link 35/55 may be a physical and/or logical coupling, which is implementation-independent (e.g. wired or wireless).

According to embodiments of the present invention, a system may comprise any conceivable combination of the thus depicted devices/apparatuses and other network elements, which are arranged to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any procedural step or functionality is suitable to be implemented as software or by hardware without changing the ideas of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, system in package (SIP), or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable. That is, for example, it is possible to perform the above mentioned timing advance procedure and the connectivity adjustment procedure either individually or in combination.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

We claim:

1. A method for small cell discovery and user equipment discovery, the method comprising:
    obtaining, by circuitry of a user equipment, small cell information regarding small cell discovery on a macro layer;
    obtaining, by the circuitry, user equipment information regarding user equipment discovery;

determining, by the circuitry, whether the user equipment information includes all first parameters necessary for performance of standalone user equipment discovery without the small cell information;

building the first parameters for user equipment discovery, by the circuitry when the circuitry determines that the user equipment information does not include all of the first parameters necessary for the performance of standalone user equipment discovery, based on second parameters included in the small cell information, the second parameters being parameters for performance of the small cell discovery;

initiating, by the circuitry, user equipment discovery based on the first parameters; and initiating, by the circuitry, small cell discovery based on the second parameters.

2. The method according to claim 1, wherein the second parameters included in the small cell information comprise at least a parameter related to small cell discovery periodicity and a parameter related to a time shift of the user equipment periodicity with respect to the small cell discovery periodicity.

3. The method according to claim 1, wherein a timing of the small cell discovery is linked to a system frame number of a macro network or the system frame number of a macro base station from which the small cell information is obtained.

4. The method according to claim 1, wherein the small cell information is included in at least one system information block transmitted from a macro base station.

5. The method according to claim 1, wherein the user equipment is in a Long Term Evolution or Long Term Evolution Advanced based cellular communication network.

6. The method according to claim 1, wherein the user equipment comprises a mobile phone.

7. A method for small cell discovery and user equipment discovery, the method comprising:

preparing, by circuitry of a base station, small cell information regarding small cell discovery;

preparing, by the circuitry, user equipment information regarding user equipment discovery;

determining, by the circuitry, whether the user equipment information depends on the small cell information, the user equipment information depending on the small cell information when the user equipment information does not include all parameters necessary for performance of standalone user equipment discovery without the small cell information;

modifying, by the circuitry when the user equipment information depends on the small cell information, the user equipment information to include a link to the small cell information; and transmitting, by the circuitry, the small cell information and the user equipment information to a user equipment.

8. The method according to claim 7, wherein the small cell information comprises parameters including at least a parameter related to small cell discovery periodicity and a parameter related to a time shift of user equipment periodicity with respect to the small cell discovery periodicity.

9. The method according to claim 7, wherein a timing of the small cell discovery is linked to a system frame number of a macro network or the system frame number of the base station.

10. The method according to claim 7, wherein the small cell information is included in at least one system information block transmitted from the base station.

11. The method according to claim 7, wherein the base station is in a Long Term Evolution or Long Term Evolution Advanced based cellular communication network.

12. A user equipment for small cell discovery and user equipment discovery, the user equipment comprising:

circuitry configured to:
obtain small cell information regarding small cell discovery on a macro layer;
obtain user equipment information regarding user equipment discovery;
determine whether the user equipment information includes all first parameters necessary for performance of standalone user equipment discovery without the small cell information;
building the first parameters for user equipment discovery, when the circuitry determines that the user equipment information does not include all of the first parameters necessary for the performance of standalone user equipment discovery, based on second parameters included in the small cell information, the second parameters being parameters for performance of the small cell discovery;
initiate user equipment discovery based on the first parameters; and
initiate small cell discovery based on the second parameters.

13. The user equipment according to claim 12, wherein the parameters included in the small cell information comprise at least a parameter related to small cell discovery periodicity and a parameter related to a time shift of the user equipment periodicity with respect to the small cell discovery periodicity.

14. The user equipment according to claim 12, wherein a timing of the small cell discovery is linked to a system frame number of a macro network or the system frame number of a macro base station from which the small cell information is obtained.

15. The user equipment according to claim 12, wherein the user equipment is in a Long Term Evolution or Long Term Evolution Advanced based cellular communication network.

16. A base station for small cell discovery and user equipment discovery, the base station comprising:

circuitry configured to:
prepare small cell information regarding small cell discovery;
prepare user equipment information regarding user equipment discovery;
determine whether the user equipment information depends on the small cell information, the user equipment information depending on the small cell information when the user equipment information does not include all parameters necessary for performance of standalone user equipment discovery without the small cell information;
modify, when the user equipment information depends on the small cell information, the user equipment information to include a link to the small cell information; and
transmit the small cell information and the user equipment information to a user equipment.

17. The base station according to claim 16, wherein the small cell information comprises parameters including at least a parameter related to small cell discovery periodicity and a parameter related to a time shift of the user equipment periodicity with respect to the small cell discovery periodicity.

18. The base station according to claim 16, wherein a timing of the small cell discovery is linked to a system frame number of a macro network or the system frame number of the base station.

19. The base station according to claim 16, wherein the small cell information is included in at least one system information block transmitted from the base station.

20. The base station according to claim 16, wherein the base station is in a Long Term Evolution or Long Term Evolution Advanced based cellular communication network.

* * * * *